United States Patent [19]

Nagano

[11] Patent Number: 5,192,248
[45] Date of Patent: Mar. 9, 1993

[54] MULTI-STAGE SPROCKET ASSEMBLY FOR BICYCLE

[75] Inventor: Masashi Nagano, Izumi, Japan

[73] Assignee: Shimano, Inc., Osaka, Japan

[21] Appl. No.: 752,035

[22] Filed: Aug. 29, 1991

[30] Foreign Application Priority Data

Jun. 24, 1990 [JP] Japan ................... 3-151243
Sep. 4, 1990 [JP] Japan ................... 2-234972

[51] Int. Cl.$^5$ ............................................. F16H 7/18
[52] U.S. Cl. .................................... 474/140; 474/160
[58] Field of Search .................... 474/80, 140, 160; 74/594.1, 594.2

[56] References Cited

U.S. PATENT DOCUMENTS

| | | | |
|---|---|---|---|
| 4,198,876 | 4/1980 | Nagano | 474/160 X |
| 4,348,200 | 9/1982 | Terada | 474/160 |
| 4,813,916 | 3/1989 | Valin | 474/152 |
| 4,960,402 | 10/1990 | Klein et al. | 474/140 X |
| 5,002,520 | 3/1991 | Greenlaw | 474/140 |
| 5,087,226 | 2/1992 | Nagano | 474/160 |

FOREIGN PATENT DOCUMENTS 0313345 10/1988 European Pat. Off. .
2469624 5/1981 France .
2005363 4/1979 United Kingdom .

Primary Examiner—Thuy M. Bui
Attorney, Agent, or Firm—Dickstein, Shapiro & Morin

[57] ABSTRACT

A multi-stage sprocket assembly for a bicycle has a small sprocket, a large sprocket disposed coaxially with the small sprocket and a shift assist projection provided to the large sprocket for assisting a shifting movement of a chain from the small sprocket to the large sprocket. The assembly includes a guide face for guiding an outer side face of link plate of the chain. The guide face is formed in a side face of a second tooth of the large sprocket facing the small sprocket, the second tooth being forwardly adjacent, relative to a moving direction of the chain, a first tooth of the large sprocket which comes into engagement with a leading portion of the shifting chain. The shift assist projection is so displaced toward the small sprocket that the projection comes into engagement with the shifting chain portion at a position forwardly distant from a position of the engagement between the leading end of the shifting chain portion and the first tooth by a distance which is substantially an integer multiple of a disposing pitch of the large sprocket teeth. Also, the shift assist projection has such a radial height as to prevent this projection from extending into a rotary drive-moving path of the chain as fully engaging the large sprocket for propelling the bicycle.

12 Claims, 9 Drawing Sheets

MULTI-STAGE SPROCKET ASSEMBLY FOR BICYCLE

BACKGROUND OF THE INVENTION

1. Field of the Invention

The present invention relates to a multi-stage sprocket assembly for a bicycle, the assembly including a small sprocket, a large sprocket disposed coaxially with the small sprocket and a shift assist projection provided to the large sprocket for assisting a shifting movement of a chain from the small sprocket to the large sprocket.

2. Description of the Related Art

A multi-stage sprocket assembly of the above-described type is known from e.g. the U.S. Pat. Ser. No. 4,348,200. In this assembly, two of the teeth of the large sprocket are cut away and the shift assist projection is integrally formed at this cutaway portion. In the operation of shifting the chain from the small sprocket to the large sprocket, the chain first comes into engagement with the shift assist projection and then with a tooth of the large sprocket, thus reducing an amount of 'overshift' of the chain. As a result, the chain shift can be effected by a relatively small manual force.

One problem of the above convention is that the chain tends to engage too deeply with the shift assist projection. This excessive engagement results in a large radial displacement of the engaged chain portion relative to the entire chain segment being shifted to the large sprocket and results consequently in locking of the chain portion at the projection thereby intefering with the chain shift.

Further, according to this conventional sprocket assembly, the distance between a tooth of the large sprocket which first engages with the shifting chain portion (i.e. a tooth adjacent the cutaway portion) and the shift assist projection is not set substantially as an integer multiple of a disposing pitch of the large sprocket teeth. Because of this, the shifting chain portion tends to ride on a tooth crest of the large sprocket, thus intefering with the chain shift.

SUMMARY OF THE INVENTION

A first object of the present invention is to provide improvement in the sprocket assembly of the above type which improvement enables smooth disengagement of the chain segment from the shift assist projection.

A second object of the invention is to provide further improvement in the assembly which improvement prevents the chain portion from riding on the tooth crest of the large sprocket thus smoothing the chain shift.

For accomplishing the first and second objects noted above, a multi-stage sprocket assembly for a bicycle, according to the present invention, comprises:

a small sprocket;

a large sprocket disposed coaxially with the small sprocket;

a shift assist projection provided to the large sprocket for assisting a shifting movement of a chain from the small sprocket to the large sprocket;

a guide face for guiding an outer side face of a link plate of the chain, said guide face being formed in a side face of a second tooth of the large sprocket facing the small sprocket, said second tooth being forwardly adjacent, relative to a moving direction of the chain, a first tooth of the large sprocket which comes into engagement with a leading portion of the shifting chain;

said shift assist projection being so displaced toward the small sprocket that said projection comes into engagement with the shifting chain portion at a position forwardly distant from a position of said engagement between the leading end of the shifting chain portion and said first tooth by a distance which is substantially an integer multiple of a disposing pitch of the large sprocket teeth;

said shift assist projection including an inclined face facing the large sprocket, said inclined face being inclined closer to the large sprocket relative to a dedendum of the large sprocket;

wherein, when said guide face and said inclinded face come into contact with the shifting chain portion, said contact prevents the chain portion engaging said shift assist projection from being excessively displaced from a shifting path of the entire shifting chain portion and prevents also excessive radial engagement between said chain portion and said shift assist projection so as to render said shifting path non-angular as viewed from the axial direction of the sprocket assembly.

According to the above-described first characterizing features of the present invention, the shift assist projection is so displaced toward the small sprocket that the projection comes into engagement with the shifting chain portion at a position distant from the position of the engagement between the leading end of the shifting chain portion and the first tooth by a distance which is substantially an integer multiple of a disposing pitch of the large sprocket teeth. Therefore, the shifting chain portion comes into smooth engagement with the first tooth without riding on the tooth crest thereof. Further, as the chain portion comes into contact with the inclined face and the guide face, the inclined face presses against the large sprocket an inner face of a link plate of the chain facing the large sprocket and also the guide face presses against the small sprocket an outer face of a further link plate facing the small sprocket, thereby effectively preventing excessive radial engagement between the chain portion and the shift assist projection and preventing also the chain portion engaging the projection from being excessively displaced from the shifting path of the entire shifting chain portion. Accordingly, the chain portion can be smoothly and shocklessly disengaged from the shift assist projection. Further, through the prevention of the excessive radial engagement between the chain portion and the projection to such an extent as to allow the entire shifting chain portion to form a non-angular shifting path, the chain shift operation can be effected very smoothly.

According to the second characterizing features of the present invention, a multi-stage sprocket assembly for a bicycle comprises:

a small sprocket;

a large sprocket disposed coaxially with the small sprocket;

a shift assist projection provided to the large sprocket for assisting a shifting movement of a chain from the small sprocket to the large sprocket;

a guide face for guiding an outer side face of a link plate of the chain, said guide face being formed in a side face of a second tooth of the large sprocket facing the small sprocket, said second tooth being forwardly adjacent, relative to a moving direction of the chain, a first tooth of the large sprocket which comes into engagement with a leading portion of the shifting chain;

said shift assist projection being so displaced toward the small sprocket that said projection comes into engagement with the shifting chain portion at a position forwardly distant from a position of said engagement between the leading end of the shifting chain portion and said first tooth by a distance which is substantially an integer multiple of a disposing pitch of the large sprocket teeth;

said shift assist projection having such a radial height as to prevent said projection from extending into a rotary drive-moving path of the chain as fully engaging the large sprocket for propelling the bicycle.

With the second features of the invention, the shift assist projection has a radial height which can prevents the projection from extending into the drive-moving path of the chain engaging the large sprocket. Therefore, the shift assist projection does not interfer with the bicycle drive action using the large sprocket.

Incidentally, during a chain shift, the shift assist projection normally comes into engagement with a wide outer link plate of the chain. Depending on an engagement relationship between the chain and the small sprocket; however, the shifting chain may be one-pitch displaced so that a narrow inner link plate of the chain will pass aside the projection without engaging it. In such case, there will occur inteference between a leading end of the outer link plate forwardly adjacent the above inner link plate and a portion of the shift assist projection, whereby the interference impairs smooth shifting or rotary motion of the chain.

In view of this problem, according to the third characterizing features of the present invention, in the construction provided with the above-described second features, a chain-hook preventing means is provided at a side face of the shift assist projection facing the small sprocket. In operation, when the projection comes aside an inner link plate of the shifting chain portion, the chain-hook proventing means allows an outer link plate of the chain portion forwardly adjacent the inner link plate to radially move closer to the small sprocket while preventing the outer link plate from being hooked at the shift assist projection.

With this third characterizing feature, even if the shifting chain portion fails to engage with the shift assist projection, there occurs no inteference between the leading end of the outer link plate and a portion of the shift assist projection, such that the chain portion smoothly bypasses the projection without being hooked at it. Consequently, the construction having this third feature can overcome the adverse effect which would otherwise result from the provision of the shift assist projection.

Further, according to a fourth characterizing feature of the invention, in the construction provided with the second features, an auxiliary shift assist projection is provided with substantially one-pitch rearward distance from the above-described shift assist projection.

With this fourth feature of the invention, even when the shifting chain portion fails to engage the shift assist projection, this portion can come into engagement with the auxiliary shift assist projection provided about one-pitch rearwardly from the former projection and then the engagement with the large sprocket will take place smoothly in the same manner as the first-described construction. Moreover, because of the increased engagement opportunities between the shift assist projections and the shifting chain portion, the construction having this fourth feature can achieve the effects of the first-described construction even more reliably.

Further and other objects, features and effects of the invention will become more apparent from the following more detailed description of the embodiments of the invention with reference to the accompanying drawings.

BRIEF DESCRIPTION OF THE DRAWINGS

FIGS. 1 through 9 illustrate a first preferred embodiment of a multi-stage sprocket assembly for a bicycle relating to the present invention; in which, FIG. 1 is a side view of the sprocket assembly during a chain shift as seen from an axial direction of the assembly, FIG. 2 is a plane view of the assembly of FIG. 1, FIG. 3 is an enlarged side view of a shift assist projection provided to the assembly, FIG. 4 is a plane view of FIG. 3, FIG. 5 is a vertical section of major portions of an intermediate sprocket provided with the shift assist projection, FIG. 6 is a side view as seen from the other side of FIG. 3, FIG. 7 is a side view of major portions of the assembly where the chain shift is just completed, FIG. 8 is a side view showing an entire drive system of the bicycle, and FIG. 9 is a side view of major portions relating to modified constructions of a dedendum surface and a side face of a tooth, FIGS. 10 through 13 illustrate a second preferred embodiment of the present invention; in which, FIG. 10 is a view corresponding to FIG. 1 of the first embodiment, FIG. 11 is a view corresponding to FIG. 2, FIG. 12 is a side view, FIG. 13 is a plane view.

DESCRIPTION OF THE PREFERRED EMBODIMENTS

Preferred embodiments of a multi-stage sprocket assembly for a bicycle, relating to the present invention, will now be described in details with reference to the accompanying drawings.

Figure 8:
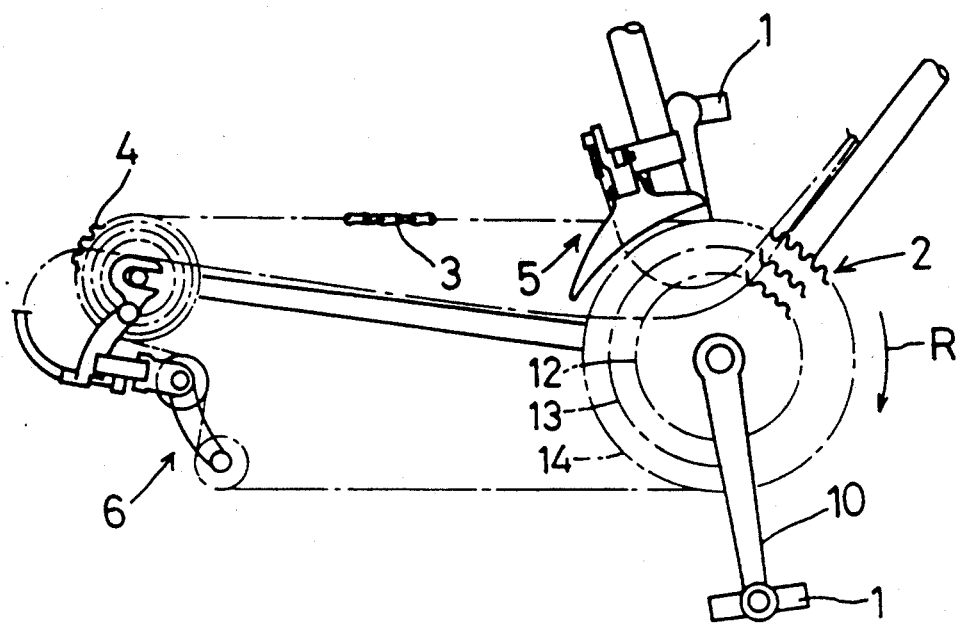

FIG. 8 shows a change-speed mechanism of a bicycle. A propelling force applied by a rider's foot force on a pedal 1 is transmitted to a front multi-stage sprocket assembly 2 and then transmitted through an endless chain 3 to a rear multi-stage sprocket assembly 4 for driving the bicycle. A change speed operation is effected by shifting the chain 3 in a horizontal direction H by means of a front derailleur 5 and/or a rear derailleur 6. A reference mark R denotes a rotary drive direction of the front sprocket assembly 2.

Figure 1:
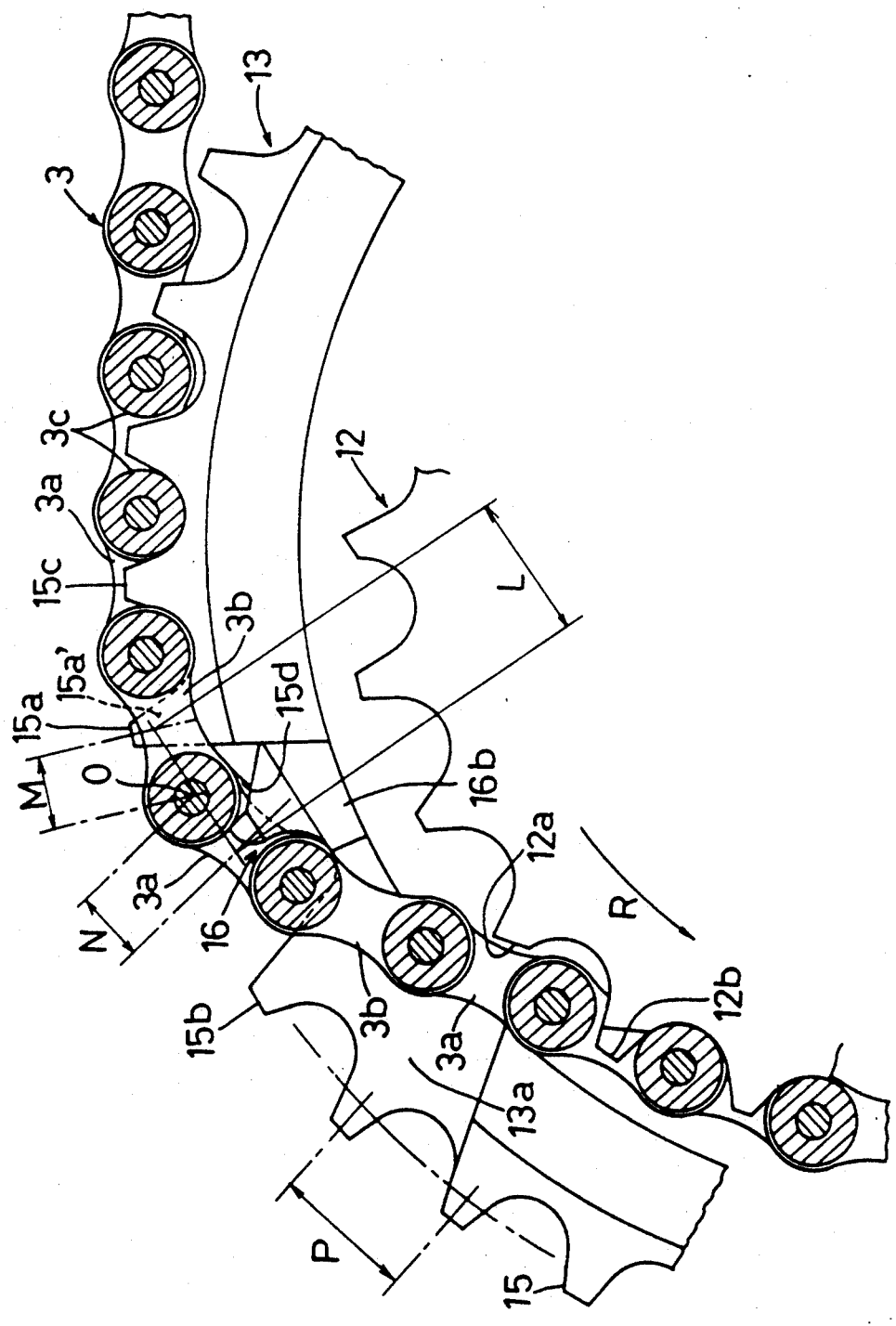
Figure 2:
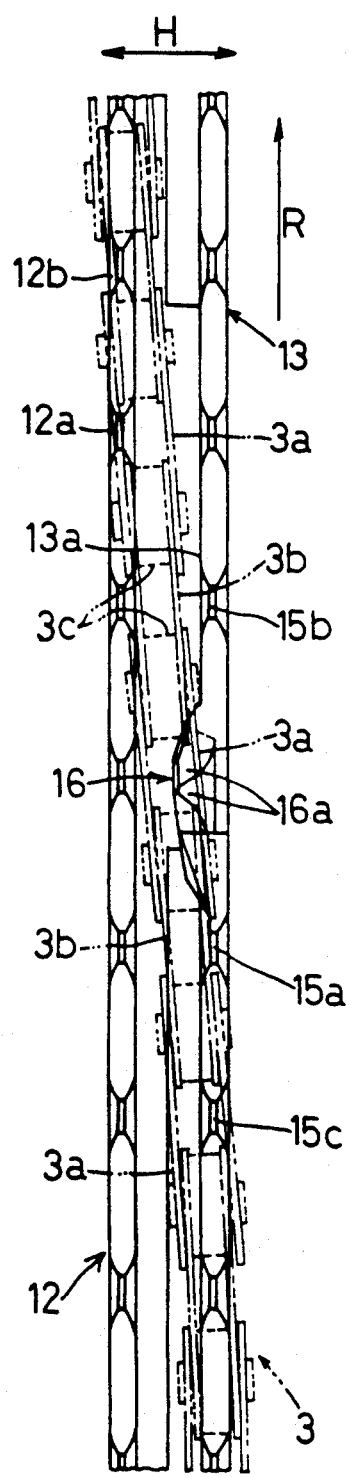
Figure 3:
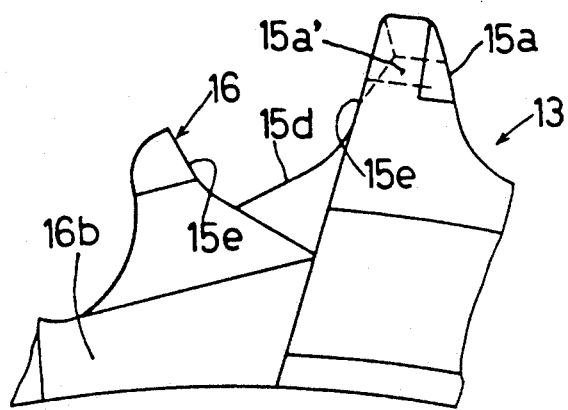
Figure 4:
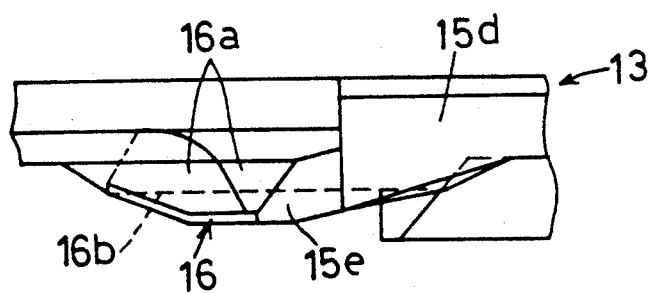
Figure 5:
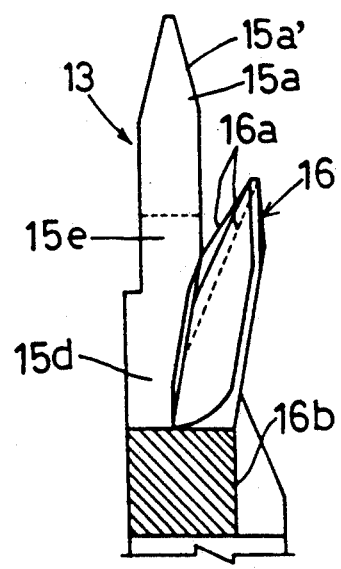
Figure 6:
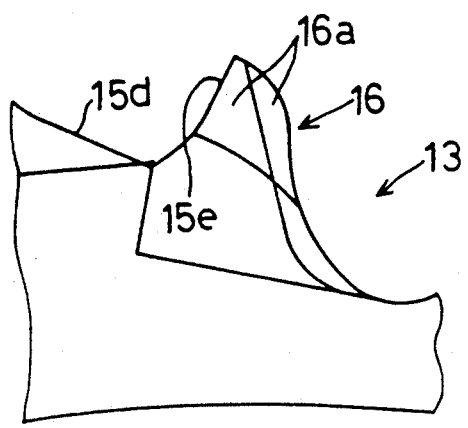
Figure 7:
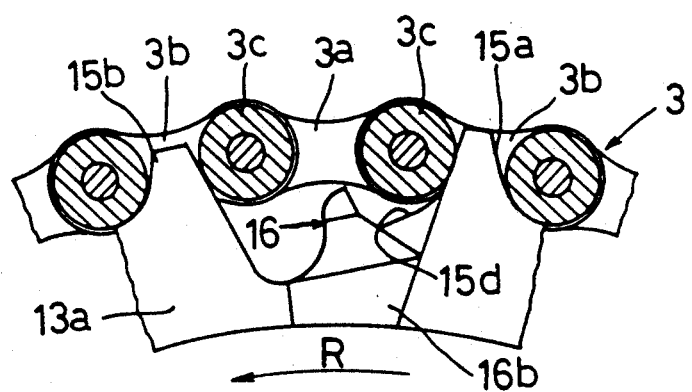
Figure 9:
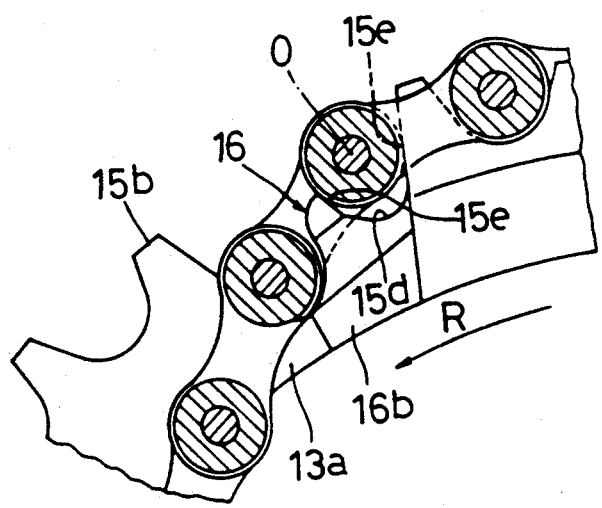

The chain 3, as shown in FIGS. 1 and 2, is an endless roller chain consisting of an endless series of pluralities of wide outer link plates 3a and narrow inner link plates 3b pivotally and alternately interconnected to one another. In FIGS. 1, 7 and 9, the immediate sides of the link plates 3a, 3b are not shown.

Referring now to FIG. 8, the front multi-stage sprocket assembly 2 includes an arm radially projecting from a boss of a right-side crank arm 10 and three sprockets 12, 13, 14 of different diameters coaxially fixed on the arm with a predetermined axial distance from each other.

In the following description of the embodiments, a shift operation of the chain 3 from the smallest sprocket 12 and the intermediate sprocket 13 which is larger in diameter than the sprocket 12 will be described as one example of a chain shift operation.

As shown in FIGS. 1 through 6, the intermediate sprocket 13 integrally forms a shift assist projection 16. This projection 16, when the chain 3 is shifted from the small sprocket 12 to the intermediate sprocket 13, comes into engagement with a shifting portion of the chain 3 and assists engagement of the chain portion 3 with one of teeth 15 of the intermediate sprocket 13. It is preferred that the sprocket 13 include this shift assist projection 16 at a plurality of predetermined portions associated with a pitch of the chain portion 3 being shifted from the small sprocket 12 to the intermediate sprocket 13. In the instant embodiment, each shift assist projection 16 is between a pair of teeth 15a, 15b of the teeth 15 disposed with an interdistance two times greater than a disposing pitch P of the intermediate sprocket teeth 15 and is displaced towards the small sprocket 12 relative to the intermediate sprocket teeth 15. Further, for automatically drawing the chain portion 3 engaging the projection 16 towards the teeth 15 by means of the drive force of the chain 3 associated with a rotation of the front sprocket assembly 2, the shift assist projection 16 includes, at its side face facing the intermediate sprocket 13, an inclined face 16a which is inclined to be closer to the intermediate sprocket 13 in the direction towards a dedendum. Also, at a side of the shift assist projection 16, one tooth 15 is eliminated for avoiding inteference during the shifting movement of the chain 3. Incidentally, this elimination of the tooth 15 is not essential for the sprit of the present invention. Also, the shift assist projection 16 can be formed integrally with the sprocket 13 by means of a pressing process or the projection 16 can be attached as a separate entity to the sprocket 13.

The shift assist projection 16 is so displaced toward the small sprocket 12 that this projection 16 comes into engagement with the shifting chain portion 3 at a position distant from a position of engagement between a leading end of the shifting chain portion 3 and a first tooth 15c by a distance which is substantially an integer multiple (two times in this embodiment) of the disposing pitch P of the large sprocket teeth 15. The first tooth 15c is a tooth which comes into first engagement with the leading end of the chain portion 3. Now, of the pair of teeth 15a, 15b, the one disposed rearward relative to the drive rotation direction R of the sprocket assembly 2 will be referred to hereinafter as a second tooth 15a. Whereas, the other tooth will be referred to as a first forward tooth 15b. Since the first tooth 15c and the second tooth 15a are one-pitch distant from each other, in this embodiment, the shift assist projection 16 and the second tooth 15a are disposed with an interdistance L which substantially equates with the disposing pitch P. More specifically, in this arrangement, a sum of a distance M from an inter-teeth center O determined by a dedendum face between the shift assist projection 16 and the second tooth 15a to this second tooth 15a and a further distance N from the inter-teeth center O to the center of the shift assist projection 16 is set to be substantially equal to the disposing pitch P of the intermediate sprocket teeth 15. Incidentally, in this embodiment, the shift assist projection 16 is configured like a tooth. Instead, it is possible to form this projection 16 narrower in the peripheral direction. Accordingly, the distance from the first tooth 15c to the shift assist projection 16 may be slightly shorter or longer within the limit of plus/minus 50% of the disposing pitch P. Further, in the construction of this embodiment, the inter-teeth center O where a center of connecting portion of the chain is to be positioned is determined as this connecting portion of the chain 3 is received at a dedendum face 15d.

One side face facing the small sprocket of the second tooth 15a disposed forwardly adjacent in the drive direction of the chain to the first tooth 15c of the intermediate sprocket 13 engaging with the shifting chain portion is formed as a guide face 15a' for guiding an outer side face of the link plate 3b of the chain 3. In operation, when this guide face 15a' and the afore-described inclinded face 16a come into contact with the shifting chain portion, this contact prevents the chain portion engaging the shift assist projection 16 from being excessively displaced from a shifting path of the entire shifting chain portion 3 and prevents also excessive radial engagement between the chain portion 3 and the shift assist projection 16 so as to render the shifting path of the chain portion non-angular as viewed from the axial direction of the sprocket assembly.

More specifically, as the chain portion 3 comes into contact with the inclined face 16a and the guide face 15a', the inclined face 16a presses against the intermediate sprocket 13 an inner face of the outer line 3a of the chain facing the intermediate sprocket 13 and also the guide face 15a' presses against the small sprocket 12 an outer face of an inner link plate 3b facing the intermediate sprocket, thereby effectively preventing excessive radial engagement between the chain portion 3 and the shift assist projection 16 and preventing also the chain portion 3 engaging the projection 16 from being excessively displaced from the shifting path of the entire shifting chain portion 3. Accordingly, the chain portion 3 can be smoothly and shocklessly disengaged from the shift assist projection 16. Further, through the prevention of the excessive radial engagement between the chain portion 3 and the projection 16 to such an extent as to allow the entire shifting chain portion to form a non-angular shifting path, the chain shift operation can be effected very smoothly. Accordingly, it is not absolutely necessary for the connecting portion of the chain to be received at the dedendum face 15d.

Further, the presence of the shift assist projection 16 may interfere with the normal drive rotation of the intermediate sprocket 13. Then, in order to avoid this, the shift assist projection 16 has such a radial height as to prevent this projection 16 from extending into a rotary drive-moving path of the chain 3 as fully engaging the intermediate sprocket 13 for propelling the bicycle. Specifically, as shown in FIG. 7, the crest of the shift assist projection 16 is formed low enough to very slightly contact the link plates 3a, 3b of the chain 3 engaging the intermediate sprocket teeth 15 during the drive rotation of the chain 3. Incidentally, during the drive of the chain 3, especially when the chain 3 is engaged with the smallest outermost sprocket of the rear sprocket assembly 4, the chain 3 is significantly slanted relative to the intermediate sprocket 13, so that the chain 3 may inadvertently disengage from the intermediate sprocket 13. Then, the above-described arrangement of the projection 16 very slightly contacting the link plates is such that the contact is just sufficient for preventing such inadvertent disengagement but insufficient for causing interference. In this sense, the crest of the shift assist projection 16 may slightly contact the link plates 3a, 3b or the roller 3c. In addition to the above arrangement, in order to expedite the horizontal shifting movement of the chain 3 to the intermediate sprocket 13, as shown in FIGS. 1 and 2, some of teeth of the small sprocket 12 are provided with a crest cutout portion 12a and a side cutout portion 12b. Also, the intermediate sprocket 13 includes, in its face facing the small sprocket 12 and adjacent the first forward tooth 15b, a cut-in portion 13a recessed relative to the other part of the face. Incidentally, a root portion 16b of the shift assist projection 16 is formed thick for reinforcement in the direction toward the small sprocket 12.

Next, there will be described a chain shift operation for shifting the chain 3 from the small sprocket 12 to the intermediate sprocket 13 with rotation of the above-described multi-stage sprocket assembly in the drive rotary direction R.

As the chain 3 engaging the small sprocket 12 is pushed toward the intermediate sprocket 13 by means of the front derailleur 5, as illustrated in FIGS. 1 and 2, the chain 3 is smoothly shifted in this direction for the intermediate sprocket 13 with the aids of the cutout portion 12a of the small sprocket 12 and the cut-in portion 13a of the intermediate sprocket 13 and the chain 3 becomes engaged with the shift assist projection 16. This chain portion 3 engaging the shift assist projection 16 is forcibly drawn toward the intermediate sprocket 13 by a component of the driving force acting on the chain 3. As a result, the chain 3 starts engaging the first tooth 15c which is positioned with the appropriate engaging pitch relationship with the projection 16 and with further rotation in the drive rotary direction R, the chain 3 comes into smooth engagement with the intermediate sprocket 13.

On the other hand, during a normal bicycle drive with the chain 3 engaging the teeth 15 of the intermediate sprocket 13, the afore-described inconvenience of inadvertent chain disengagement will not occur even when the chain 3 is significantly slanted, because in the assembly of the invention only one tooth is eliminated between the pair of teeth 15a, 15b.

In the above, the present invention is embodied in the relationship between the small sprocket 12 and the intermediate sprocket 13. Instead, the invention may be embodied also between the intermediate sprocket 13 and the large sprocket 14. Or, the invention is applicable to a front sprocket assembly consisting of only two large and small sprockets or of more than four sprockets. Further, depending on the size relationship among the assembly parts, a further arrangement is possible which causes the chain 3 engaging the projection 16 to come into engagement with the second tooth 15a.

A second embodiment of the present invention will be described next with reference to FIGS. 10 through 13. This second embodiment differs from the first embodiment in three respects. Namely, in the second embodiment, the tooth (to be referred to as a second forward tooth 17i hereinafter) between the pair teeth 17a, 17b is not eliminated. The shift assist projection 16 is provided as a separate entity from the intermediate sprocket 13. Further, an auxiliary shift assist projection 19 is provided in addition to the afore-described shift assist projection 16. These features will be specifically described. In the following description of the second embodiment, the components same as those employed in the first embodiment are denoted with the same reference marks and numerals.

Figure 12:
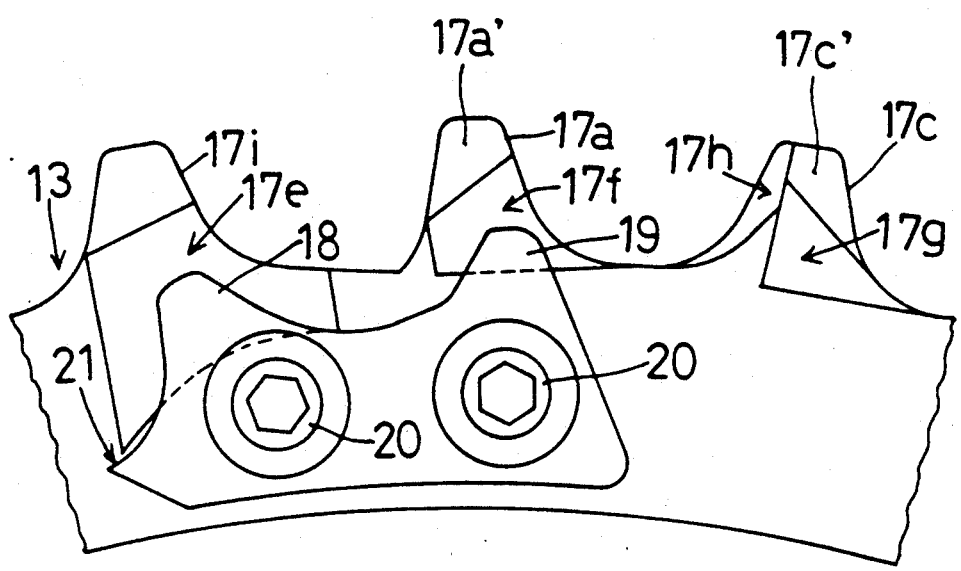
Figure 13:
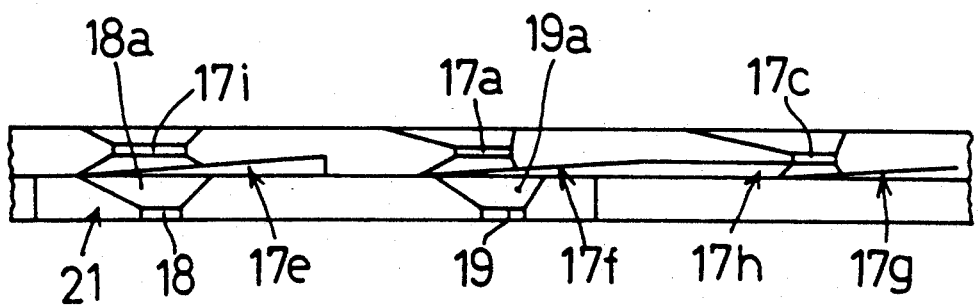

Referring to FIGS. 12 and 13, the shift assist projection 18 is formed unitary with the auxiliary shift assist projection 19. And, these projections 18 and 19 are provided as a separate entity from the intermediate sprocket 13. Further, these projections 18, 19 are fitted into a recess 13b defined in the side face of the intermediate sprocket 13 adjacent the second forward tooth 17i and the second tooth 17a and are fixed here to the intermediate sprocket 13 by means of nuts 20. The auxiliary shift assist projection 19 is disposed with the distance of the pitch P rearward in the drive rotary direction R from the shift assist projection 18. More particularly, this auxiliary shift assist projection 19 and a further first tooth 17d rearwardly in the direction R adjacent the first tooth 17c are provided with a substantially same relationship as that provided between the first tooth 17c and the shift assist projection 18 described hereinbefore. Incidentally, like the shift assist projection 18, the crest of this auxiliary shift assist projection 19 is formed low enough not to interfere with the chain 3 engaging the teeth 17 during the normal drive of the chain 3. Also, reference marks 17a' and 17c' denote the guide faces described hereinbefore.

Forwardly of the shift assist projection 18 in the drive rotation direction R, there is formed a receiver portion 21 for receiving the outer link plate 3a when a further outer link plate 3a is engaged with the auxiliary shift assist projection 19. This receiver portion 21 is so configurated that the chain portion 3 positioned forwardly in the direction R relative to the outer link plate 3a as being received at this receiver portion 21 may assume the same posture of the chain portion 3 when its outer link plate 3a engages the shift assist projection 18. As the chain portion 3 is received at this receiver portion 21, the engagement between the auxiliary shift assist projection 19 and the chain 3 can take place in more reliable manner.

In the side faces (facing the small sprocket 12) of the second forward tooth 17i, the second tooth 17a and the first tooth 17c, there are respectively formed cutout portions 17e, 17f and 17g in order to avoid interference with the side face of either link plate 3a or 3b. Further, at an angular portion of the first tooth 17c forwardly in the drive rotation direction R, there is formed a cutout portion 17h for avoiding interference with an end of the outer link plate 3a. Similarly, it is also conceivable to chamfer a portion (facing the small sprocket 12) of the shift assist projection 18 for avoiding interference with the inner link plate 3b.

Figure 10:
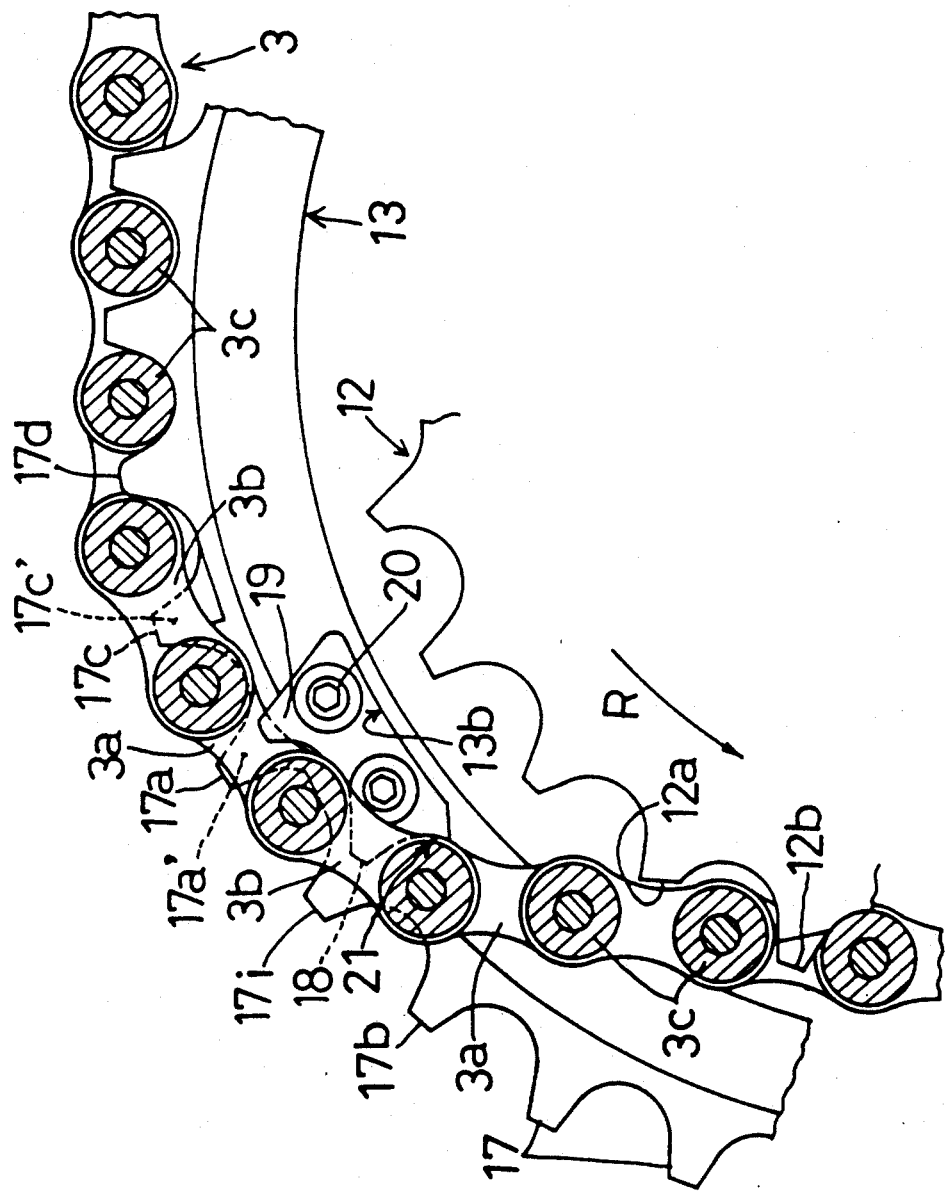
Figure 11:
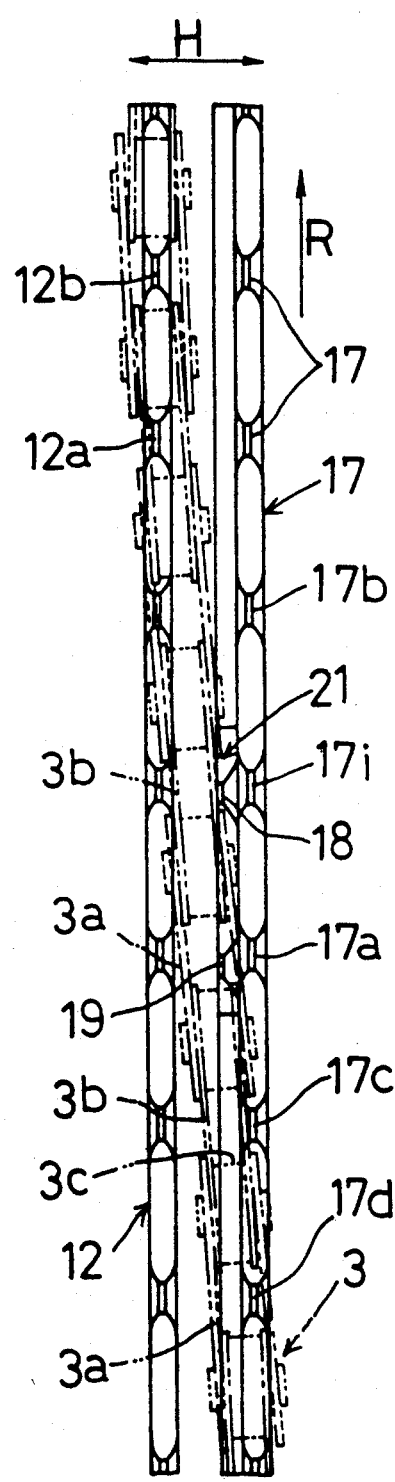

For shifting the chain with using the above-described auxiliary shift assist projection 19 of the multi-stage sprocket assembly, as illustrated in FIGS. 10 and 11, after the outer link plate 3a is received at the receiver portion 21, a next outer link plate 3a comes into engagement with the auxiliary shift assist projection 19. With this, the chain 3 is forcibly drawn to the intermediate sprocket 13 in the same manner as the foregoing embodiment. Accordingly, the chain 3 can smoothly engage the intermediate sprocket 13. Further, in this construction, a chain shift is possible also by using the shift assist projection 18. Therefore, this construction can effect smooth shift of the chain 3 regardless of any particular engagement relationship between the small sprocket 12 and the outer link plate 3a.

Figure 14:
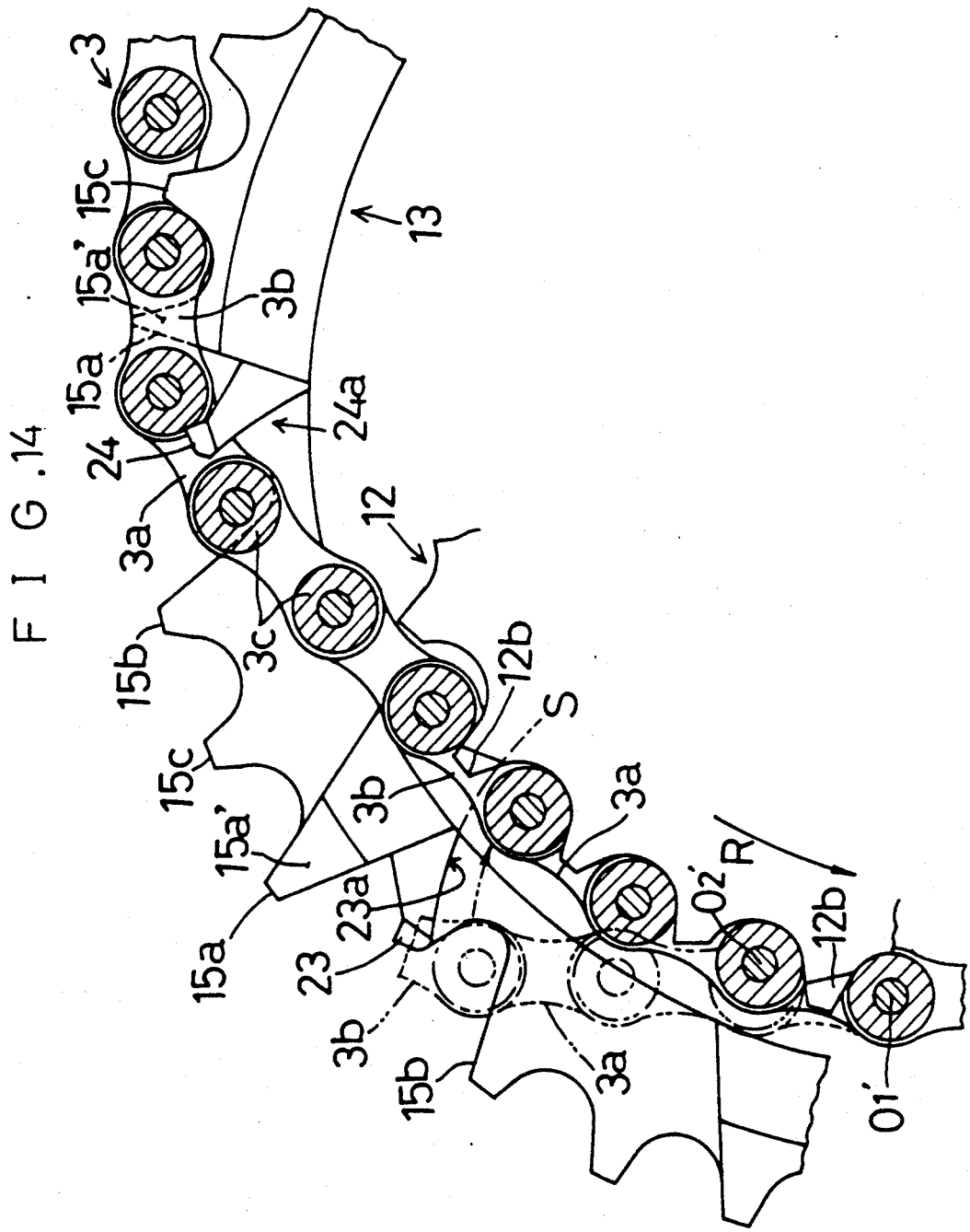
FIG. 14 illustrates a third preferred embodiment of the invention and corresponds to FIG. 1 of the first embodiment.

Next, a third preferred embodiment of the present invention will be described with reference to FIG. 14. In this fourth embodiment, adjacent rearwardly in the direction R of a first shift assist projection 23, there is provided a second shift assist projection 24. In the following description of this fourth embodiment too, the same components as those employed in the first embodiment are denoted with the same reference marks and numerals.

The first shift assist projection 23 is provided with a chain-hook preventing means. In operation, during the shift of the chain 3 from the small sprocket 12 to the intermediate sprocket 13, when the projection 23 comes aside the inner link plate 3b of the shifting chain portion 3 with one pitch displacement of the chain, the chain-hook preventing means allows the outer link plate 3a of the chain portion 3 forwardly adjacent the inner link plate 3b to radially move closer to the small sprocket 12 while preventing the outer link plate 3a from being hooked at the shift assist projection 23. More specifically, this chain-hook preventing means is formed by cutting concave a portion 23a of the projection 23, which portion 23a substantially corresponds to an arcuate path S drawn at a rear end of the outer link plate 3a and centering about a reference inter-teeth conter 01', 02' forwardly or rearwardly in the direction R of the tooth having the side cutout portion 12b. Further, in order to avoid radial interference between the second shift assist projection 24 and the outer link plate 3a, this second shift assist projection 24 too is provided with the chain-hook preventing means formed by cutting concave its portion 24a substantially corresponding to the arcuate path S. However, it is possible for the second shift assist projection 24 to do without this concave portion 24a.

With the construction of this third embodiment, even if the inner link plate 3b comes beside the first shift assist projection 23 without engaging this projection 23, because of the concave portion 23a of the first shift assist projection 23, there occurs no interference between the leading end of the outer link plate 3a and the first shift assist projection 23, such that the chain portion smoothly bypasses the projection 23 without being hooked at it. Then, with further rotation of the sprocket assembly, the outer link plate 3a becomes engaged with the second shift assist projection 24 and the chain 3 comes into smooth engagement with the intermediate sprocket 13.

Some other embodiments of the present invention will be specifically described next.
I. It is conceivable to displace the crest of the shift assist projection 16 towards the link plates 3a, 3b of the chain portion 3 engaging the teeth 15 to avoid the interference between the projection 16 and the chain 3 during a normal drive rotation of the sprocket assembly. In this case, the crest of the projection 16 can extend to a higher position than the link plates 3a, 3b of the chain 3 during the normal drive.
II. In the first embodiment, the inter-teeth center O is determined by the reception of the connecting portion of the chain 3 at the dedendum face 15d. Instead, as shown in FIG. 9, the inter-teeth center O can be determined by reception of the chain connecting portion at the further dedendum face 15e, 15e. Or, this center O can be determined not by such reception of the chain connecting portion but by abutment between the inclined face 16a and the guide face 15a' and the chain 3 for preventing excessive radial engagement of the chain 3 with the projection 16.
III. The present invention may be embodied in the rear multi-stage sprocket assembly 4.
IV. In the second embodiment, the receiver portion 21 is adapted for receiving the outer link plate 3a. Instead, it is conceivable to adapt this receiver portion 21 to receive the inner link plate 3b.
V. In the third embodiment, the chain-hook preventing means for preventing the outer link plate 3a from being hooked at either of the shift assist projections 23, 24 is constructed as the arcuate cutout concave portions 23a, 24a. Instead, these cutout concave portions 23a, 24a can be configurated e.g. linear. Also, the cutting depth in the direction H of these portions can be conveniently varied. Further alternately, this chain-hook preventing means can be constructed not as such cutout concave portions but by thinning the entire projections 23, 24.
VI. In the foregoing embodiments, the shift assist projections 16, 18, 19, 23, 24 are formed like teeth. Instead, these projections can be formed into any other shape.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:
1. A multi-stage sprocket assembly for a bicycle comprising:
   a small sprocket;
   a large sprocket disposed coaxially with the small sprocket;
   a shift assist projection provided to the large sprocket for assisting a shifting movement of a chain from the small sprocket to the large sprocket;
   a guide face for guiding an outer side face of a link plate of the chain,
   said guide face being formed in a side face of a second tooth of the large sprocket facing the small sprocket, said second tooth being forwardly adjacent, relative to a moving direction of the chain, a first tooth of the large sprocket which comes into engagement with a leading portion of the shifting chain;
   said shift assist projection being so displaced toward the small sprocket that said projection comes into engagement with the shifting chain portion at a position forwardly distant from a position of said engagement between the leading end of the shifting chain portion and said first tooth by a distance which is substantially an integer multiple of a disposing pitch of the large sprocket teeth;
   said shift assist projection including an inclined face facing the large sprocket, said inclined face being inclinded closer to the large sprocket relative to a dedendum of the large sprocket;
   wherein, when said guide face and said inclinded face come into contact with the shifting chain portion, said contact prevents the chain portion engaging said shift assist projection from being excessively displaced from a shifting path of the entire shifting chain portion and prevents also excessive radial engagement between said chain portion and said shift assist projection so as to render said shifting path non-angular as viewed from the axial direction of the sprocket assembly.

2. A multi-stage sprocket assembly according to claim 1, wherein said integer multiple has a value of 2.

3. A multi-stage sprocket assembly for a bicycle comprising:
- a small sprocket;
- a large sprocket disposed coaxially with the small sprocket;
- a shift assist projection provided to the large sprocket for assisting a shifting movement of a chain from the small sprocket to the large sprocket;
- a guide face for guiding an outer side face of a link plate of the chain,
- said guide face being formed in a side face of a second tooth of the large sprocket facing the small sprocket, said second tooth being forwardly adjacent, relative to a moving direction of the chain, a first tooth of the large sprocket which comes into engagement with a leading portion of the shifting chain;
- said shift assist projection being so displaced toward the small sprocket that said projection comes into engagement with the shifting chain portion at a position forwardly distant from a position of said engagement between the leading end of the shifting chain portion and said first tooth by a distance which is substantially an integer multiple of a disposing pitch of the large sprocket teeth;
- said shift assist projection having such a radial height as to prevent said projection from extending into a rotary drive-moving path of the chain as fully engaging the large sprocket for propelling the bicycle.

4. A multi-stage sprocket assembly according to claim 3, wherein said integer multiple has a value of 2.

5. A multi-stage sprocket assembly according to claim 3, further comprising:
- a cutout portion formed in a side face of a tooth of the large sprocket facing said shift assist projection in order to avoid interference with said side face of said tooth with the chain portion engaging said shift assist projection.

6. A multi-stage sprocket assembly according to claim 3, wherein said shift assist projection is formed as a separate entity from the large sprocket and is detachably fixed to the large sprocket.

7. A multi-stage sprocket assembly for a bicycle comprising:
- a small sprocket;
- a large sprocket disposed coaxially with the small sprocket;
- a shift assist projection provided to the large sprocket for assisting a shifting movement of a chain from the small sprocket to the large sprocket;
- a guide face for guiding an outer side face of a link plate of the chain,
- said guide face being formed in a side face of a second tooth of the large sprocket facing the small sprocket, said second tooth being forwardly adjacent, relative to a moving direction of the chain, a first tooth of the large sprocket which comes into engagement with a leading portion of the shifting chain;
- said shift assist projection being so displaced toward the small sprocket that said projection comes into engagement with the shifting chain portion at a position forwardly distant from a position of said engagement between the leading end of the shifting chain portion and said first tooth by a distance which is substantially an integer multiple of a disposing pitch of the large sprocket teeth;
- said shift assist projection having such a radial height as to prevent said projection from extending into a rotary drive-moving path of the chain as fully engaging the large sprocket for propelling the bicycle; and
- chain-hook preventing means provided at a side face of said shift assist projection facing the small sprocket; when said shift assist projection comes aside an inner link plate of the shifting chain portion, said chain-hook preventing means allowing an outer link plate of the chain portion forwardly adjacent said inner link plate to radially move closer to the small sprocket while preventing said outer link plate from being hooked at said shift assist projection.

8. A multi-stage sprocket assembly according to claim 7, further comprising:
- a further shift assist projection constructed substantially identical to said shift assist projection, said further shift assist projection being disposed rearwardly in said drive direction relative to said shift assist projection and engageable with the shifting chain portion when this shifting chain portion fails to engage said shift assist projection.

9. A multi-stage sprocket assembly according to claim 7, wherein said integer multiple has a value of 2.

10. A multi-stage sprocket assembly for a bicycle comprising:
- a small sprocket;
- a large sprocket disposed coaxially with the small sprocket;
- a shift assist projection provided to the large sprocket for assisting a shifting movement of a chain from the small sprocket to the large sprocket;
- a guide face for guiding an outer side face of a link plate of the chain,
- said guide face being formed in a side face of a second tooth of the large sprocket facing the small sprocket, said second tooth being forwardly adjacent, relative to a moving direction of the chain, a first tooth of the large sprocket which comes into engagement with a leading portion of the shifting chain;
- said shift assist projection being so displaced toward the small sprocket that said projection comes into engagement with the shifting chain portion at a position forwardly distant from a position of said engagement between the leading end of the shifting chain portion and said first tooth by a distance which is substantially an integer multiple of a disposing pitch of the large sprocket teeth;
- said shift assist projection having such a radial height as to prevent said projection from extending into a rotary drive-moving path of the chain as fully engaging the large sprocket for propelling the bicycle; and
- an auxiliary shift assist projection disposed with substantially one pitch distance rearwardly in said drive direction from said shift assist projection.

11. A multi-stage sprocket assembly according to claim 10, further comprising:
- a receiver portion for receiving said chain, said receiver portion being disposed forwardly of said shift assist projection in said drive direction.

12. A multi-stage sprocket assembly according to claim 10, wherein said integer multiple has a value of 2.

* * * * *